W. BRUEN & D. GRIDLEY.
Shawl-Strap Handle.
No. 159,892. Patented Feb. 16, 1875.
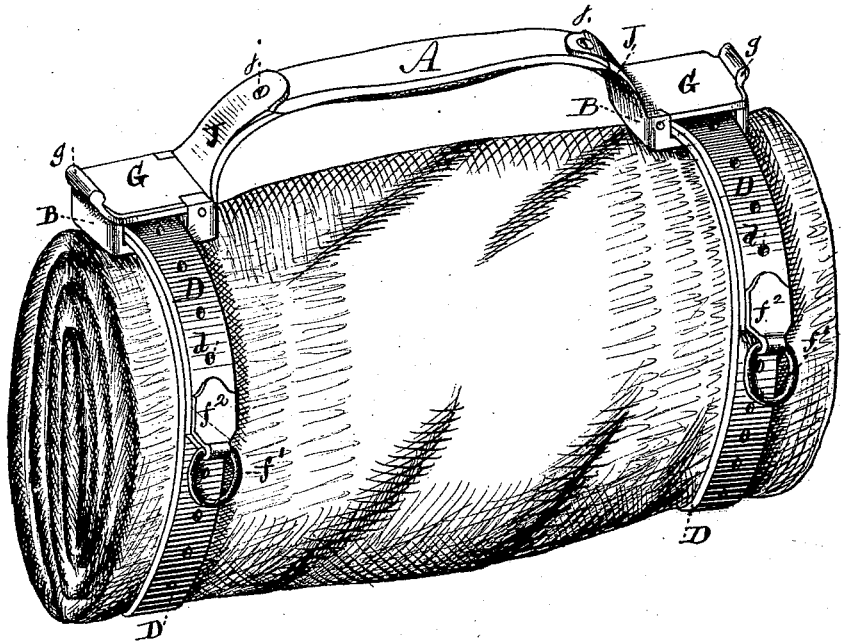
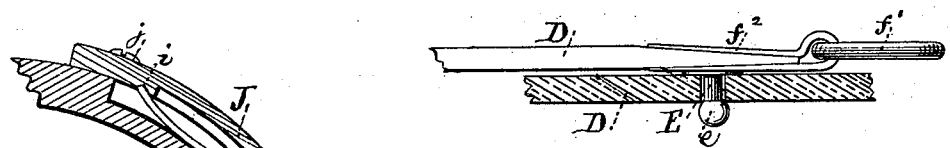
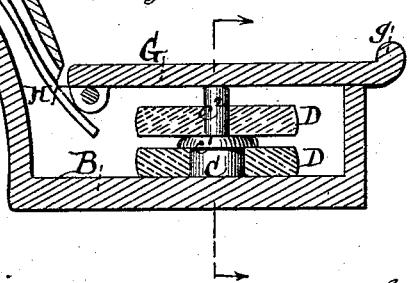
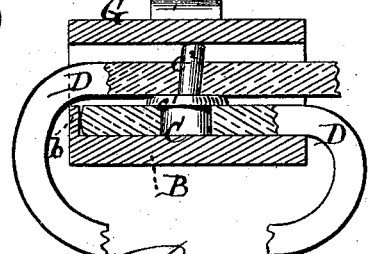
Witnesses:
Michael Ryan,
Fred Haynes
William Bruen
Dwight Gridley
by their Attorneys
Brown & Allen

UNITED STATES PATENT OFFICE.

WILLIAM BRUEN AND DWIGHT GRIDLEY, OF NEWARK, NEW JERSEY.

IMPROVEMENT IN SHAWL-STRAP HANDLES.

Specification forming part of Letters Patent No. 159,892, dated February 16, 1875; application filed January 12, 1875.

*To all whom it may concern:*

Be it known that we, WILLIAM BRUEN and DWIGHT GRIDLEY, both of Newark, in the county of Essex and State of New Jersey, have invented certain Improvements in Shawl-Straps; and we do hereby declare that the following is a full, clear, and exact description thereof, reference being had to the accompanying drawing, forming part of this specification.

Our invention consists in a novel construction and arrangement of a handle and attached straps, whereby several advantages are obtained without the use of buckles, as hereinafter particularly described and set forth.

In the accompanying drawing, Figure 1 is a perspective view of our invention as applied to a shawl or other package. Fig. 2 is a sectional view longitudinally of the handle, and transversely of the strap. Fig. 3 is a sectional view taken in the line $x\,x$ of Fig. 2. Fig. 4 is a detail view.

The handle A is of metal, with boxes B at the ends for the reception of the straps. From the bottom of each box extends upward a stud, C, the lower half of which is larger than the upper half. The strap D is attached to the box by passing the stud through a hole in the strap, and then upsetting the metal of the lower half, so as to form a flange, $c^1$, pressing on the strap and riveting it in place, as shown in Figs. 2 and 3. The upper half of the stud is slightly inclined in the direction of the length of the strap, as shown in Fig. 3, and serves as a hook, $c^2$, to hold the strap in place when passed around a shawl or package, by engaging with a hole in the strap, somewhat after the manner of a buckle-tongue. The end of the strap which is fastened to the handle is prevented from wear, when the other portion of the strap is passed over it, by means of an upwardly-projecting edge of the box B, which forms a guard, $b$, as shown in Fig. 3. The strap D is provided with a number of holes, $d$, at regular distances apart. At the free end of the strap is a ring, $f^1$, or other suitable device for handling it, which is attached to the strap by means of a plate, $f^2$, which also serves to protect the end of the strap. Projecting from this plate is a stud, E, provided with a rounded head or knob, $e$, the shank of the stud being about the same size as the holes $d$, and the knob or head being somewhat larger. When the strap is passed around the bundle and secured by the hook $c^2$, the free end of the strap is held closely against the other portion and prevented from swinging about by passing the knob or head $e$ of the stud E through one of the holes $d$, as shown in Figs. 1 and 4, in which position the free ends of the straps are held without the necessity for passing them through loops or keepers, or tucking them under the other portion of the strap. Each of the boxes B is provided with a lid or cover, G, hinged to the inner side thereof, or the portion toward the center of the handle. The outer edge of the lid or cover is provided with a projecting thumb-piece, $g$, to facilitate the opening and closing of the same. The rear or inner edge of the cover bears against a spring, H, which has a tendency to keep the lid or cover closed down upon the box, except when said lid is thrown back beyond a vertical line drawn through its hinge-pivot, in which case the spring holds the lid open.

When it is desired to pass the strap around a bundle, as in Fig. 1, the lid is raised and remains up until the operation is completed, when it is shut down and held down by the spring, and thus serves to secure the stud C and the portion of the strap attached thereto, and to prevent displacement of the strap.

If desired, the cover G may be arranged to slide or to swing on a pivot in a horizontal direction; but the arrangement shown is deemed preferable. The spring H lies in a recess, $a$, formed in the handle A, and is concealed and protected and held in place by means of a plate or cap, J, covering the recess and spring, and fastened to the handle by means of a screw, $j$, so that it may be removed when necessary. The upper end of the spring engages with a notch in the cap J, and the curved portions engage with the recess $a$ in the handle and a similar recess, $k$, in the cap, and thus the spring is held in place without the necessity for a rivet or other fastening.

The outer surfaces of the caps J and the covers G may be carved or ornamented in any suitable manner, so that the article will present a neat and handsome appearance.

What we claim as new, and desire to secure by Letters Patent, is—

1. The combination, with the boxes B and s'r ips D, of the studs C, having the flanges $c^1$ and inclined upper portions or hooks $c^2$, substantially as and for the purposes shown and described.

2. The combination, with the handle A and boxes B, of the lids or covers G and springs H, substantially as shown and described.

3. The caps J, in combination with the springs H and handle A, substantially as and for the purpose shown and described.

WILLIAM BRUEN.
DWIGHT GRIDLEY.

Witnesses:
JOSEPH JONES,
JACOB H. BAKER.